Sanford & Mallory.
Flax Brake.
Nº 36,674.  Patented Oct. 14, 1862.
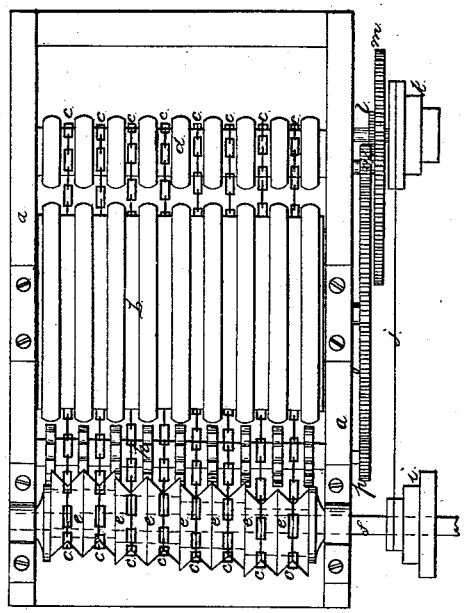
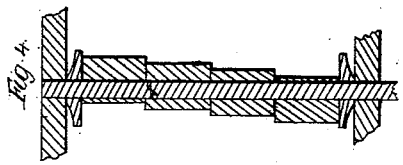
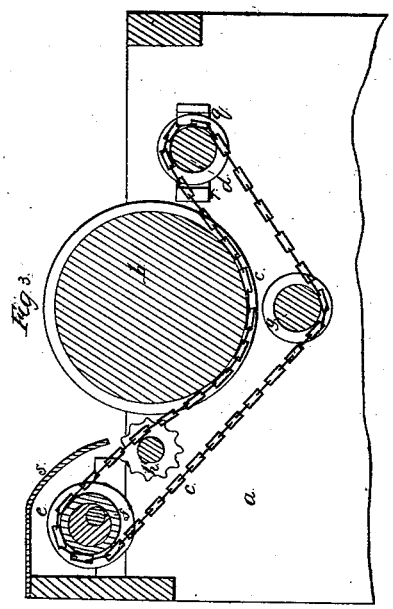
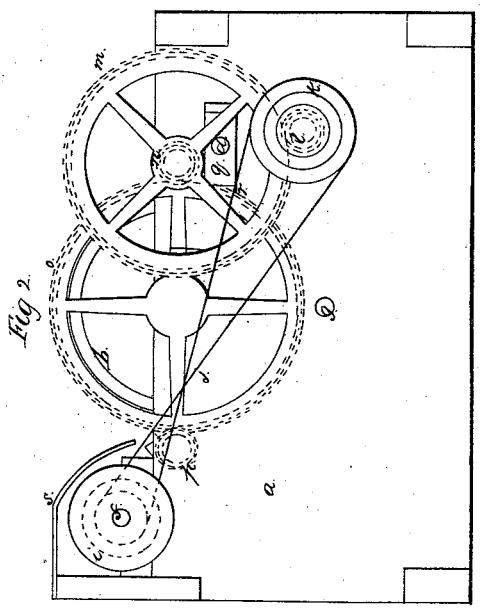
Witnesses
Wm H Bishop
A. DeLacy
Inventor
Gelston Sanford
Jas E Mallory

UNITED STATES PATENT OFFICE.

GELSTON SANFORD AND JAMES E. MALLORY, OF NEW YORK, N. Y.

IMPROVEMENT IN MACHINERY FOR BREAKING AND CLEANING FLAX AND HEMP.

Specification forming part of Letters Patent No. 36,674, dated October 14, 1862.

*To all whom it may concern:*

Be it known that we, GELSTON SANFORD and JAMES E. MALLORY, both of the city, county, and State of New York, have invented a certain new and useful Machine for Breaking and Cleaning Flax and other like Fiber-Yielding Plants; and we do hereby declare that the following is a full, clear, and exact description thereof, reference being had to the accompanying drawings, making part of this specification, in which—

Figure 1 is a plan of the machine; Fig. 2, a side elevation; Fig. 3, a longitudinal vertical section, and Fig. 4 a separate view of the many-throw crank.

The same letters indicate like parts in all the figures.

The object of our said invention is to effect more perfectly than by any other known plan the breaking and cleansing of flax and other like fiber-yielding plants. In performing this important operation on such plants, the object is to break the woody parts of the plant, and not only to effectually remove from the fibers all the particles of woody matter so broken, but to do this without serious injury to the fibers, and at the same time to loosen and separate the cementing matter which attaches the woody part to the fibers, and which, until removed, leaves them in a harsh, rough, and rigid condition. In the many experiments which we have made on this subject we have observed that if the flax be gripped between the thumb and finger of both hands, and in close proximity, and a short vibratory motion be given while pressing the stalks between the rubbing-surfaces presented by the thumb and finger of the two hands, the woody part and cementing matter are readily broken and reduced to very small particles which readily drop from the fibers, leaving them thoroughly cleansed and soft and uninjured.

The object of our invention has been to embody in an organized machine the mode of operation performed by the hands in working the process above described, and such is the nature of the invention for which we claim a patent.

In the accompanying drawings, $a$ represents the frame, and $b$ a large horizontal roller with a series of circumferential grooves, into which grooves a series of chains, $c\ c$, work, there being one chain for each groove. The chains $c$ are endless, and pass around a small grooved roller, $d$, back of the main roller $b$, and also around a series of small grooved wheels, $e$, in front. The grooved wheels $e$ are mounted on a series of cranks on a many-throw crank-shaft, $f$, each crank carrying two of the said wheels. In the accompanying drawings this is represented as a four-throw crank-shaft, as represented separately in Fig. 4, the centers of the four cranks being at equal distances from the axis of rotation and at equal distances apart, so that the action of the pairs of chains shall be successive, for a purpose to be presently described. The number of chains, grooves, and wheels may be varied at the pleasure of the constructer, the number of cranks and their relative position in the circle being varied as the number of chains are increased or decreased.

The axis of the crank-shaft $f$ is placed above the axis of the main grooved roller $b$, and at the feeding-in end of the machine; and the axis of the small grooved roller $d$, which is at the delivery end of the machine, is placed below the axis of the main grooved roller $b$, so that the upper part of the chains $c$, from the wheels $e$ to the small grooved roller $d$, passes in the grooves of the main roller $b$, and the under part of the said chains passes under a small guide-roller, $g$, below the main roller $b$.

Between the wheels $e$ and the main roller $b$ there is a feed-roller, $h$, which is also grooved, so that the chains in passing over it shall be below the periphery, which presents a series of toothed wheels, which correspond with and run nearly in contact with the ridges between the grooves of the main roller $b$. The crank-shaft $f$, which is also the driving-shaft, is provided with a set of coned pulleys, $i$, connected by a band, $j$, with another set of coned pulleys, $k$, that turn on a stud, and they carry a pinion, $l$, which engages a cog-wheel, $m$, on a stud, and this carries a pinion, $n$, which engages a wheel, $o$, on the shaft of the main roller $b$, which wheel $o$ drives a pinion, $p$, on the shaft of the feed-roller. The proportions of this train of gearing should be such as to cause the peripheries of the main roller $b$ and the feed-roller to travel at or about the same speed; and the object of the coned pulleys is, by shifting the belt $j$, to admit of increasing or decreasing the working action of the chains relatively to the motion of the main grooved roller. By increasing the velocity of the crank-shaft $f$, which carries the series of grooved chain-wheels $e$, the action of the chains is increased, and vice versa.

The journals of the small grooved roller $d$ are mounted in sliding boxes $q$ $q$, provided with india-rubber or other springs, $r$ $r$, the tension of which forces the small roller from the main roller to distend the chains and cause them to make pressure against the main roller when the cranks carrying the grooved wheels $e$ make that part of their circuit farthest from the main roller $b$; but, instead, the required tension on the chains can be given by applying the springs to the boxes in which the journals of the guide-roller $g$ below the main roller run.

Above the series of small grooved wheels $e$ there is a feed-table, $s$, on which the flax (or other fiber-yielding plant) is placed, and from which it is fed into the machine by an attendant, who lays it across on the chains, whence it is taken regularly by the teeth of the feed-roller and carried between the main roller and the series of chains, by which it is forced into the series of grooves and there broken, and carried along until it is delivered at the other side over the small grooved roller $d$.

The mode of operation of the chains in connection with the grooves is peculiar, and constitutes the leading feature of our said invention; and this mode of operation on the flax when analyzed will be found to be essentially like the action which takes place when the flax-straw is gripped between the thumb and fingers of both hands, as stated in reference to experiments made by us. The woody part is not only snapped in very small pieces, but rubbed alternately in opposite directions longitudinally and transversely, thereby completely separating the fragments and cementing matter from but without breaking the fibers. By the rotation of the many-throw crank-shaft the chains alternately in pairs are drawn tight, and thereby caused to make pressure against the flax and to force it into the grooves of the main roller, and thereby to bend it in the grooves and over the ridges that separate the grooves, while at the same time the chains slide on it and rub it. As the first pair of chains is gradually loosened by the rotation of the crank-shaft the next pair begins to make pressure, and so on throughout the series, all the pairs acting in this manner several times before the flax is delivered. In this way it will be seen that the flax is not only rubbed across its length, but also in the direction of its length by being bent into the grooves and drawn over the ridges.

The mode of operation above described can be produced by ropes, or anything analogous thereto, having sufficient indentations or roughness to take hold of the flax; and we have contemplated the application of the principle or mode of operation of our said invention by means of ropes or equivalents therefor; but the use of chains formed with open links and working in conjunction with an opposing surface we deem the best, for the reason that the openings in the links permit the free discharge of the matter to be separated from the fibers; and although we prefer the use of a grooved roller as the opposing surface to the chains, having by actual test found that to be the best, still we do not wish to limit our claim of invention to such mode of application, as other and equivalent forms may be substituted. As an equivalent, although in our judgment inferior, we have contemplated the use of a grooved non-rotating surface, or a series of slats, to either of which, if desired, may be given a short vibratory motion, the flax being fed in between such grooved surface or slats and the series of chains or their equivalents, and in such case the chains must be caused to travel in one direction, in addition to the movement for making pressure on and rubbing the flax. Nor do we wish to be understood as limiting our claim of invention to the use of a many-throw crank carrying grooved wheels for imparting the gripping motions to the series of chains or their equivalents, as other and equivalent means may be substituted therefor; and so with the working of the chains in pairs to alternate the action on the flax, we prefer such mode of application, because in our judgment it is the best; but it will be obvious that this may be varied without departing from the mode of operation which characterizes our said invention from all other known machines for this and analogous purposes.

What we claim as our invention, and desire to secure by Letters Patent, is—

The combination of a grooved surface, or the equivalent thereof, with a series of chains, or the equivalent thereof, having a mode of operation substantially such as herein described, and for the purpose set forth.

GELSTON SANFORD.
JAS. E. MALLORY.

Witnesses:
WM. H. BISHOP,
A. DE LACY.